US010061302B2

(12) United States Patent
Jacobs et al.

(10) Patent No.: US 10,061,302 B2
(45) Date of Patent: Aug. 28, 2018

(54) 3D PRINTING WASTE MATERIAL HANDLING AND TRANSFER

(71) Applicant: 3D Systems, Inc., Rock Hill, SC (US)

(72) Inventors: Jos Wim Jacobs, Wilsonville, OR (US); Nathan Hult, Wilsonville, OR (US); Keith Newell, Wilsonville, OR (US); Keaton Jonathan Daniel Snyder, Wilsonville, OR (US); Jasper Kent Wong, Wilsonville, OR (US); Gustavo Fricke, Wilsonville, OR (US); Scott Summit, Wilsonville, OR (US)

(73) Assignee: 3D Systems, Inc., Rock Hill, SC (US)

( * ) Notice: Subject to any disclaimer, the term of this patent is extended or adjusted under 35 U.S.C. 154(b) by 314 days.

(21) Appl. No.: 15/143,278

(22) Filed: Apr. 29, 2016

(65) Prior Publication Data
US 2016/0370792 A1    Dec. 22, 2016

Related U.S. Application Data

(60) Provisional application No. 62/181,709, filed on Jun. 18, 2015.

(51) Int. Cl.
| | | |
|---|---|---|
| *G05B 19/4099* | (2006.01) | |
| *B33Y 40/00* | (2015.01) | |
| *B08B 1/00* | (2006.01) | |
| *B29C 64/35* | (2017.01) | |

(52) U.S. Cl.
CPC .......... *G05B 19/4099* (2013.01); *B08B 1/005* (2013.01); *B29C 64/35* (2017.08); *B33Y 40/00* (2014.12); *B08B 1/007* (2013.01); *G05B 2219/49023* (2013.01)

(58) Field of Classification Search
CPC ................ G05B 19/4099; G05B 15/02; G05B 2219/49023; B33Y 40/00
USPC .......................................................... 700/118
See application file for complete search history.

(56) References Cited

U.S. PATENT DOCUMENTS

| | | | |
|---|---|---|---|
| 6,902,426 B2 | 6/2005 | Varnon et al. | |
| 7,074,029 B2 | 7/2006 | Stockwell et al. | |
| 2005/0017393 A1* | 1/2005 | Stockwell | ........... B29B 17/0005 264/113 |
| 2006/0217674 A1* | 9/2006 | Romano | ............. A61M 1/0001 604/320 |
| 2007/0063366 A1* | 3/2007 | Cunningham | .......... B29C 64/40 264/37.1 |

\* cited by examiner

*Primary Examiner* — Ziaul Karim

(57) ABSTRACT

A waste removal and transfer assembly for a 3D printing system comprises a waste material remover and a waste material collector. The waste material remover comprises a movable waste removing element selectively movable into contact with a planerizer roller to remove 3D printing waste material from the planerizer roller. The waste material remover is coupled to translate with the planerizer roller and comprises an opening leading to a waste material receptacle configured to receive waste material and at least one port selectively operable to transfer waste material from the waste receptacle. The waste material collector has a receiving position that is stationary relative to the waste material remover. The waste material collector comprises an opening and a waste material storage recess to receive waste material transferred from the waste material remover via the at least one port and to store the received waste material for subsequent disposal.

13 Claims, 16 Drawing Sheets

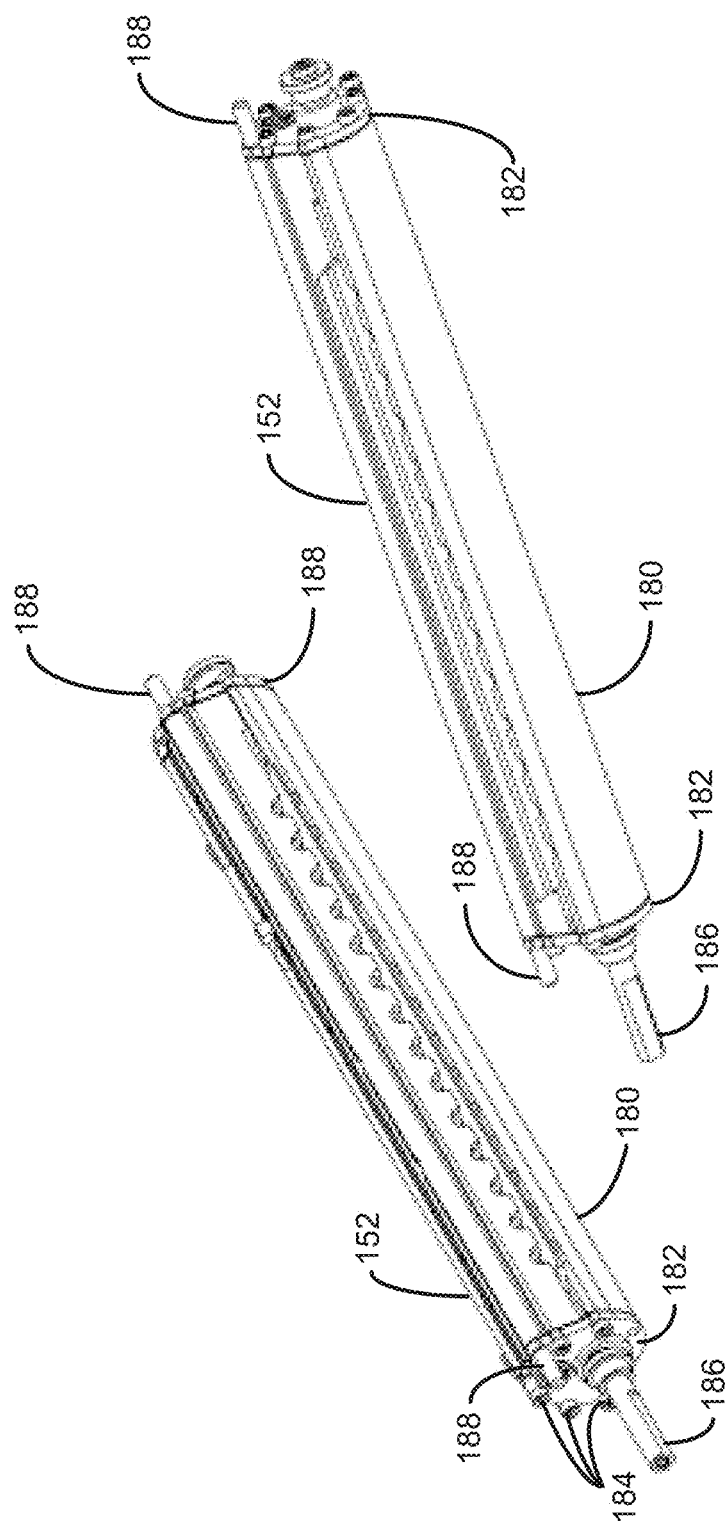

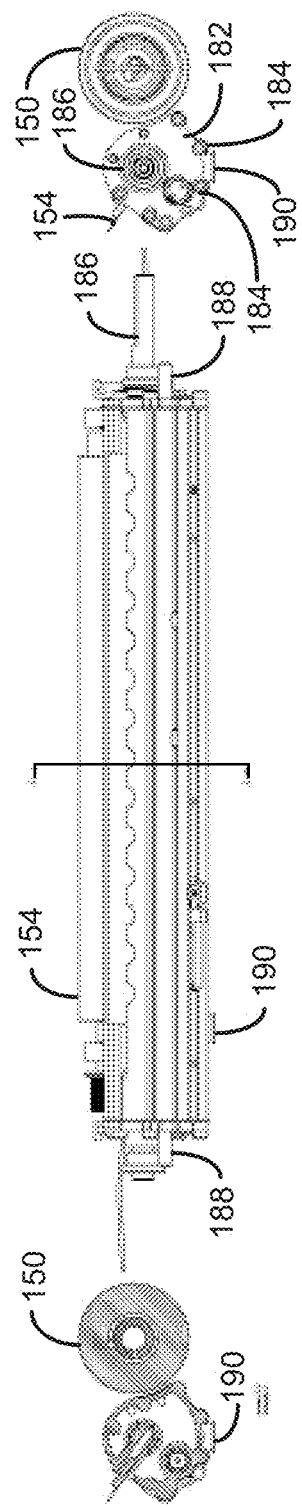

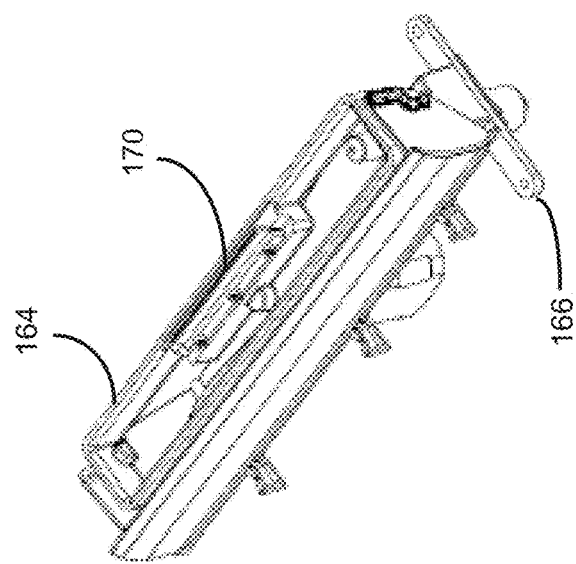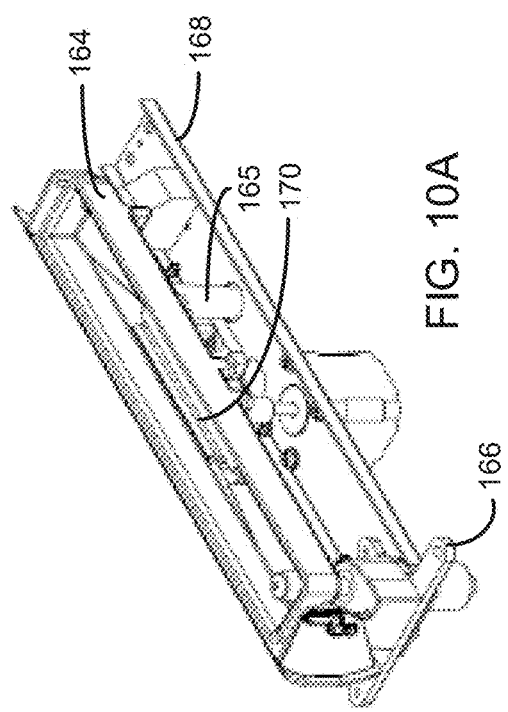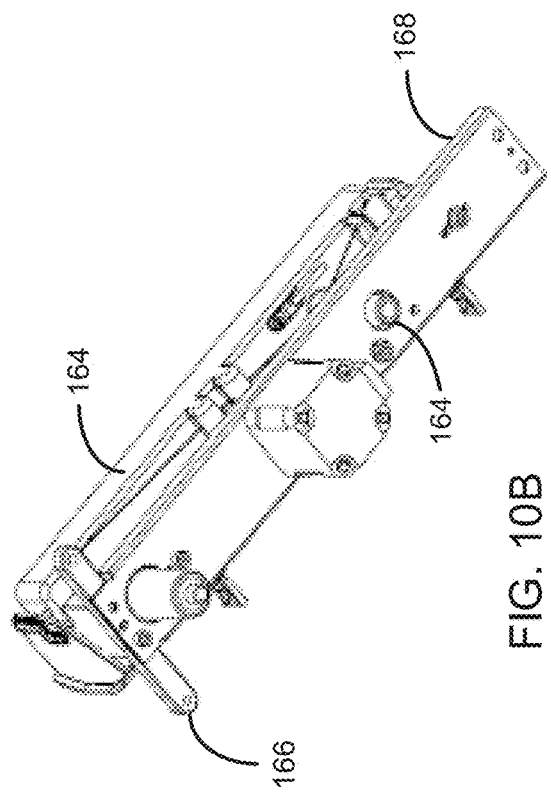

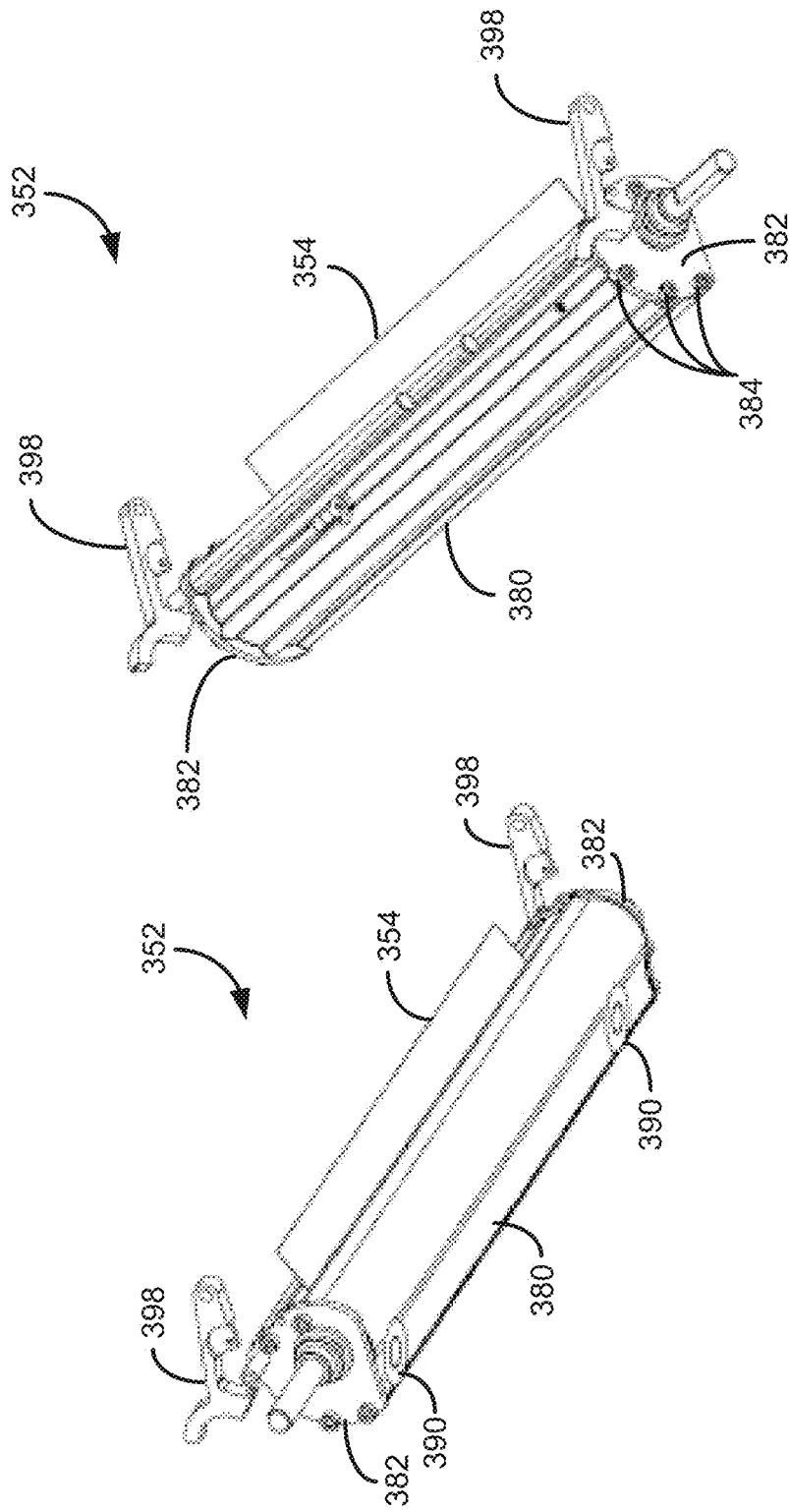

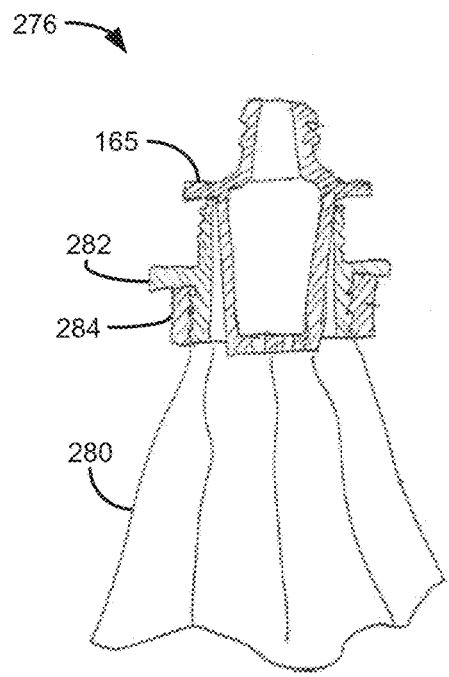
FIG. 14
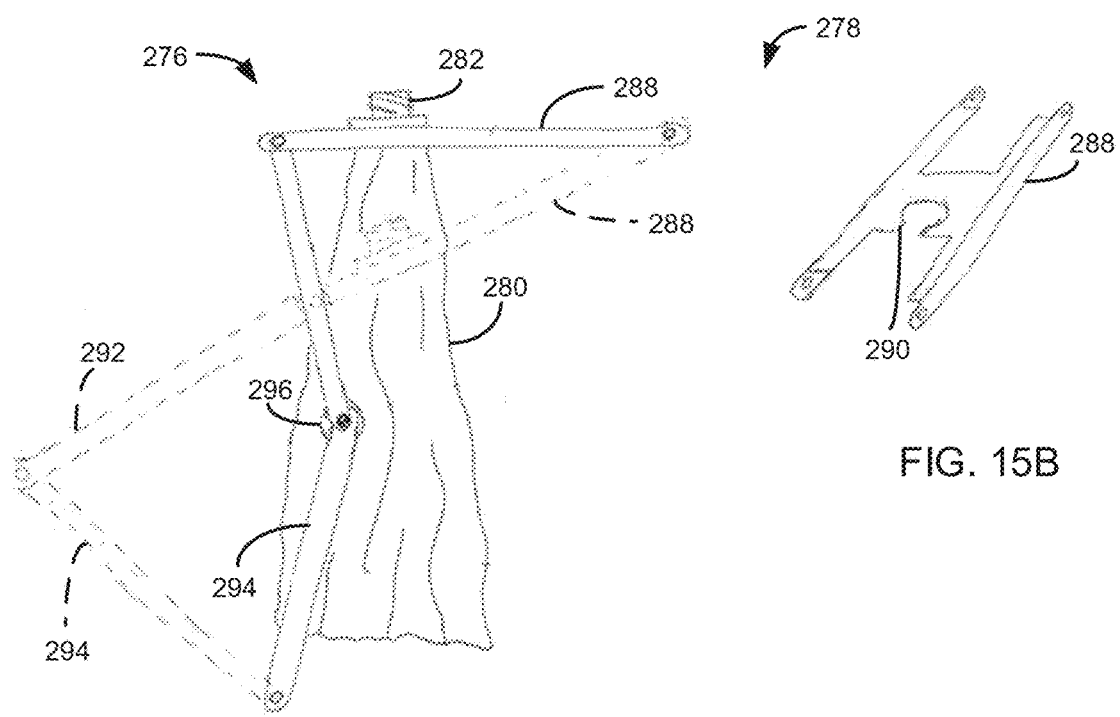
FIG. 15A
FIG. 15B

US 10,061,302 B2

3D PRINTING WASTE MATERIAL HANDLING AND TRANSFER

CROSS REFERENCE TO RELATED APPLICATION

This application claims the benefit of U.S. Provisional Patent Application No. 62/181,709, filed Jun. 18, 2015, which is hereby incorporated by reference.

BACKGROUND

In some 3D printing systems, waste material arises as 3D workpieces or models are built (or "printed). Handling waste material in a manner that does not detract from printing accuracy or impose constraints on throughput is very important. In addition, the waste material must be collected for transfer and ultimate disposal in a way that is safe, reliable and effective for end users. In many cases, waste material must be kept within a certain temperature range to ensure that it remains in a flowable state and does not cause undesired blockages within the system. Thus far, however, known waste material systems have proven to be complicated and a source of frequent maintenance concerns in 3D printing systems.

SUMMARY

Described below are representative implementations of waste material handling and transfer approaches that address problems in the prior art.

A waste removal and transfer assembly for a 3D printing system comprises a waste material remover and a waste material collector. The waste material remover comprises a movable waste removing element selectively movable into contact with a planerizer roller to remove 3D printing waste material from the planerizer roller. The waste material remover is coupled to translate with the planerizer roller and comprises an opening leading to a waste material receptacle configured to receive waste material and at least one port selectively operable to transfer waste material from the waste receptacle. The waste material collector has a receiving position that is stationary relative to the waste material remover. The waste material collector comprises an opening and a waste material storage recess to receive waste material transferred from the waste material remover via the at least one port and to store the received waste material for subsequent disposal. Methods are also described.

The foregoing and other objects, features, and advantages will become more apparent from the following detailed description, which proceeds with reference to the accompanying figures.

BRIEF DESCRIPTION OF THE DRAWINGS

FIGS. 5D and 5E are perspective views showing the waste material remover of FIG. 1 from different vantages.

FIGS. 7A, 7B and 7C are end elevation, side elevation and sectioned side elevation views, respectively, similar to FIGS. 5A-5C but showing the waste material remover in a different position relative to the planerizer roller.

FIGS. 10A, 10B and 10C are addition perspective views of the head maintenance system of the 3D printing system of FIG. 1.

FIGS. 11A and 11B are perspective views of an alternative waste material remover.

FIG. 14 is a partial side view in elevation of a waste bag, showing a sectioned waste bag cap.

FIG. 15A is a side elevation view of one embodiment of a waste bag holder.

FIG. 15B is a perspective view of a top plate of the waste bag holder.

DETAILED DESCRIPTION

Figure 1:
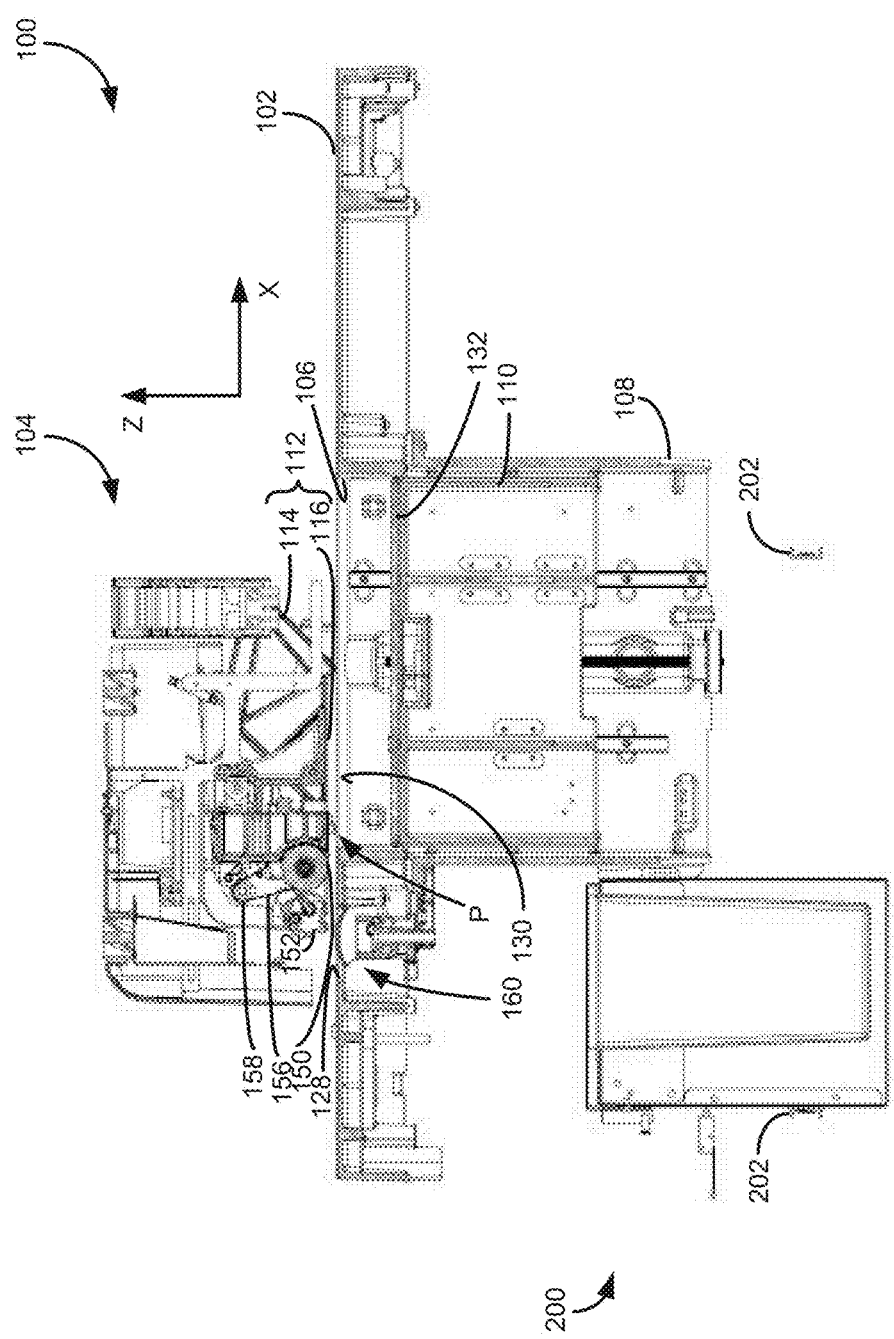
FIG. 1 is a sectioned side elevation view of a 3D printing system.

FIG. 1 is a side elevation view, which is shown in section, of major components of a 3D printing system 100. The 3D printing system has a frame 102 that extends generally horizontally and defines an XY plane, with the X-axis extending across the page and the Y-axis extending out of the page. The frame 102 is also referred to as an X-axis base. A moving carriage 104, which is positioned above the frame 102, is controllably movable relative to the frame 102, such as to carry out steps of a 3D printing sequence. Within the frame 102, an opening 106 is defined. The opening 106 is defined to lie in the XY plane, and thus a Z-axis extends normal to the opening 106, i.e., generally vertically, in a direction as shown in the figure. A Z-axis base 108 is positioned below the frame 102 and aligned with the opening 106. A Z-axis stage 110 is movably coupled to the Z-axis base 108 and the frame 102, e.g., to raise or lower a build surface 130 in the Z-axis direction as described in more detail below.

The moving carriage 104 includes a lateral member 112 that extends at least partially across the frame 102 in the Y-axis direction and is configured to translate in the X-axis direction. The lateral member 112 includes an X-axis drive member 114 and an X-axis cross member 116, as best shown in the perspective view of FIG. 8. Among other components, the moving carriage 104 supports a print head that carries out the 3D printing. The print head P is supported by the moving carriage 104 to translate in the X-direction. In addition, the print head P translates back and forth in the Y-direction relative to the X-axis cross member 116. In this way, the print head P can be controlled to cover all of a printing area defined by the X and Y dimensions of the build plate 132, which is dimensioned to fit closely within the opening 106 and flush with the surrounding upper surface of the frame 102. In FIG. 1, a build plate 132, the upper surface of which defines the build surface 130, is shown for purposes of illustration after having been moved to a height below the frame 102, through controlled movement of the Z-axis stage 110.

There is a planerizer roller 150 having an axis of rotation that extends in the Y-direction. The planerizer roller 150 is supported by and translates with the moving carriage 104. The planerizer roller 150 is positioned adjacent the print head P and functions to "smooth out" or "planerize" 3D printing material after it has been deposited by the print head P on the developing model. A waste material remover 152 is positioned adjacent and parallel to the planerizer roller 150. The waste material remover 152 has a protruding planerizer blade 154 positionable to contact a surface of the planerizer roller 150. In FIG. 1, the planerizer blade 154 is shown in position to scrape waste 3D printing material that has adhered to the planerizer roller 150 away from its surface and through an opening into a body of the waste material remover 152 for temporary storage as described below in more detail. The planerizer roller 150 is driven in rotation by a drive belt 156 that is in turn driven by a drive wheel 158.

Figure 2:
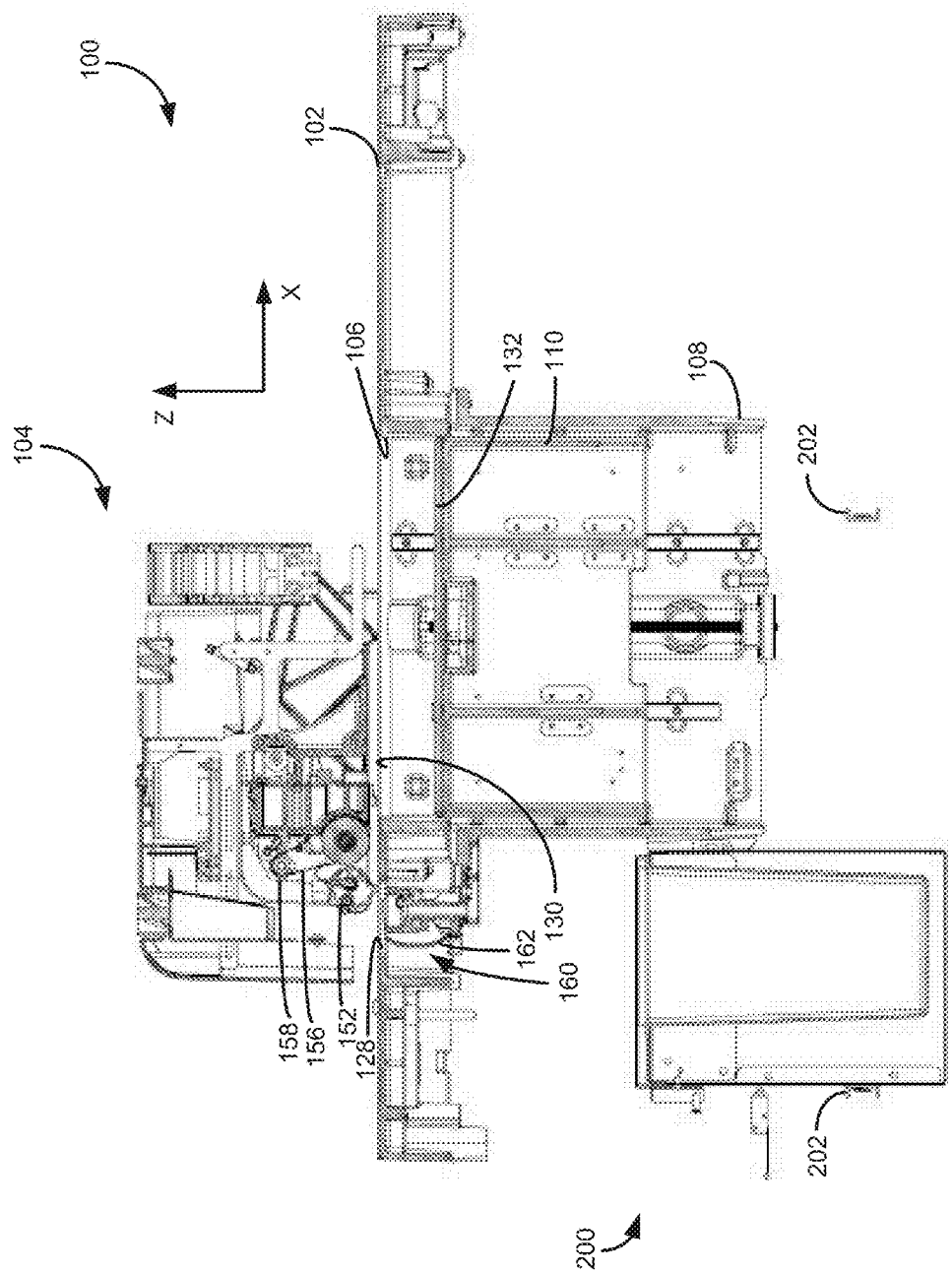
FIGS. 2, 3 and 4 are additional sectioned side elevation views similar to FIG. 1, but showing components of the 3D printing system in different operating positions.
Figure 3:
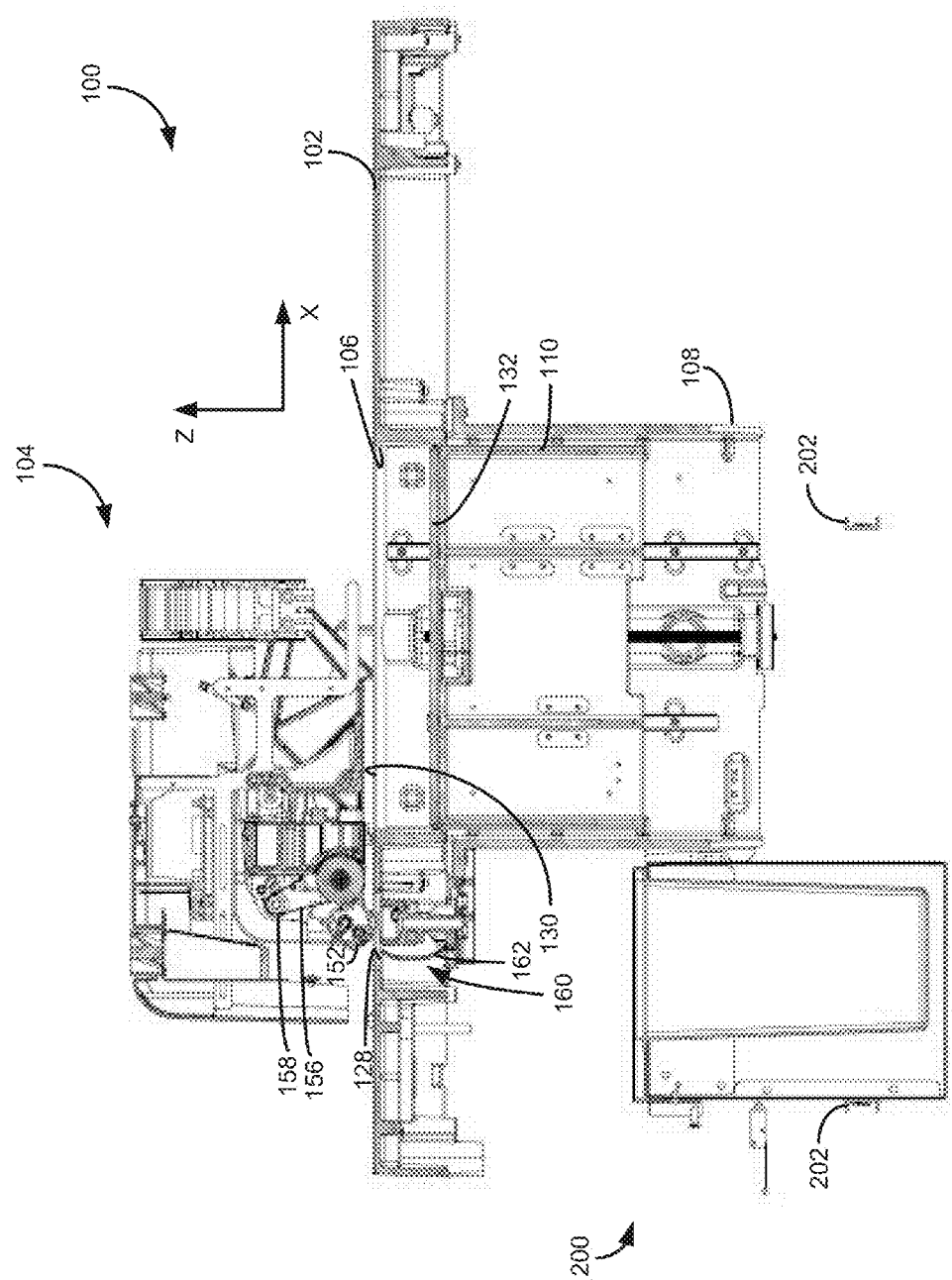
Figure 4:
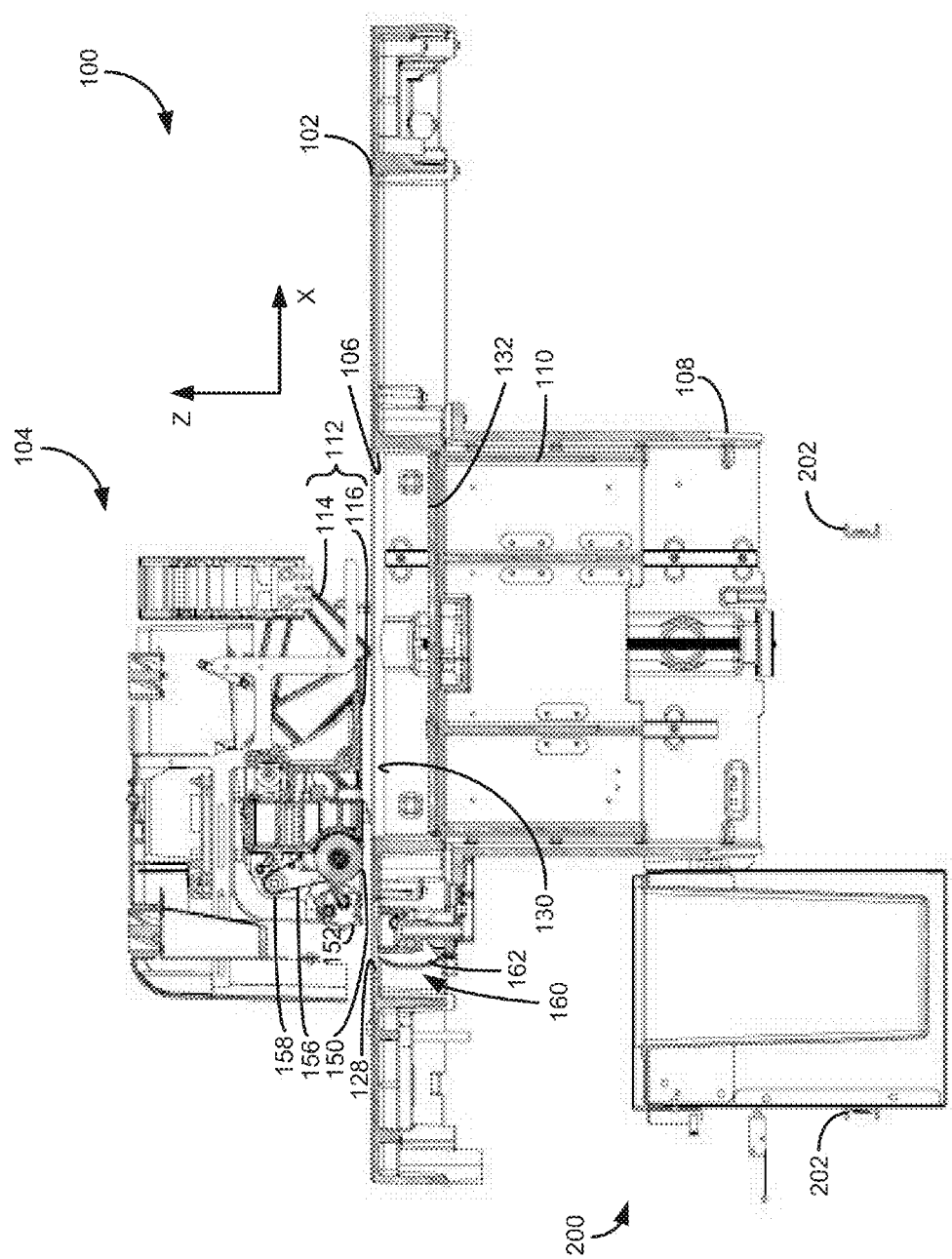

There is a head maintenance system 160 with which the waste material remover 152 interacts to maintain the print head P, including to discard waste material that has been scraped from the planerizer roller 150. As best seen in FIG. 2, the head maintenance system 160 has a cover 162 that has been controlled to move to an open position to expose a waste opening 128 in the frame 102. Comparing FIG. 1 and FIG. 2, it can be seen that the waste material remover 152 has begun to rotate in a counterclockwise direction from its position in FIG. 1. In FIG. 3, the waste material remover 152 has rotated further such that its contents can be drained into the head maintenance system 160, as is described in further detail below.

Referring to FIGS. 9A, 9B, 10A, 10B and 10C, which show components of the head maintenance system 160 removed from their surroundings for greater clarity, there is a waste material collector 164, which can be shaped as an open trough or receptacle as shown, that is positioned beneath the cover 160 and defines a recess or space into which waste material is received. Waste material is drained from the waste material collector 164 via a drain spout 165. The head maintenance system is mounted in place via mounting apertures, such as in a mounting member 166 and elsewhere, by using, e.g., threaded fasteners (not shown).

In some embodiments, other components of the head maintenance system 160 are also controlled to move. For example, the waste material collector 164 can be controlled to move vertically upward from a storage position (FIG. 1) to a receiving position (FIG. 2) to facilitate the process of receiving the waste material transferred from the waste material remover 152.

As best seen in FIGS. 10A and 10C, there is a wiper or blade 170 positioned to contact the printhead P as the carriage 104 is controlled to translate across the head maintenance station 160.

Figures 5A, 5B, 5C:
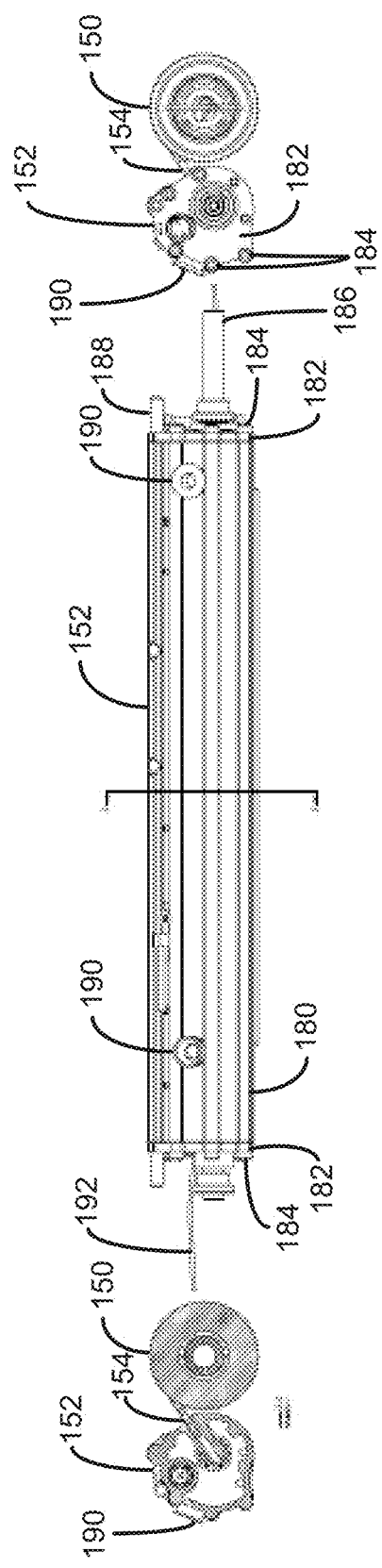
FIGS. 5A, 5B and 5C are end elevation, side elevation and sectioned side elevation views, respectively, of the waste material remover and planerizer roller of FIG. 1.

FIG. 5A is an end elevation view of the waste material remover 152 and the planerizer roller 150 as seen from the left side of FIG. 2. FIG. 5B is a side elevation view of the right side of FIG. 5A, and FIG. 5C is a sectioned side elevation view of the left side of FIG. 5A. The waste material remover 152 has a body 180 that extends parallel to its axis of rotation and an end plate 182 attached to each end by fasteners 184. There is a shaft 186 that defines the axis of rotation for the waste material remover 152 and is driveable to rotate the waste material remover through a sequence of positions. A mount 188 extends outwardly from each of the end plates 182. As best seen in FIG. 5A, there is at least one port 190, such as the two ports as shown, through which waste material in the waste material remover 152 can be drained into the waste material collector 164. The waste material remover 152 can be fitted with a heater, such as an electrical heater connected to the power cord 192, to keep the waste material at a desired temperature, e.g., such that the waste material flows well and can be easily drained from the waste material remover 152. FIGS. 5D and 5E are perspective views of the waste material remover 152 to show its configuration from different vantages.

Figures 6A, 6B, 6C:
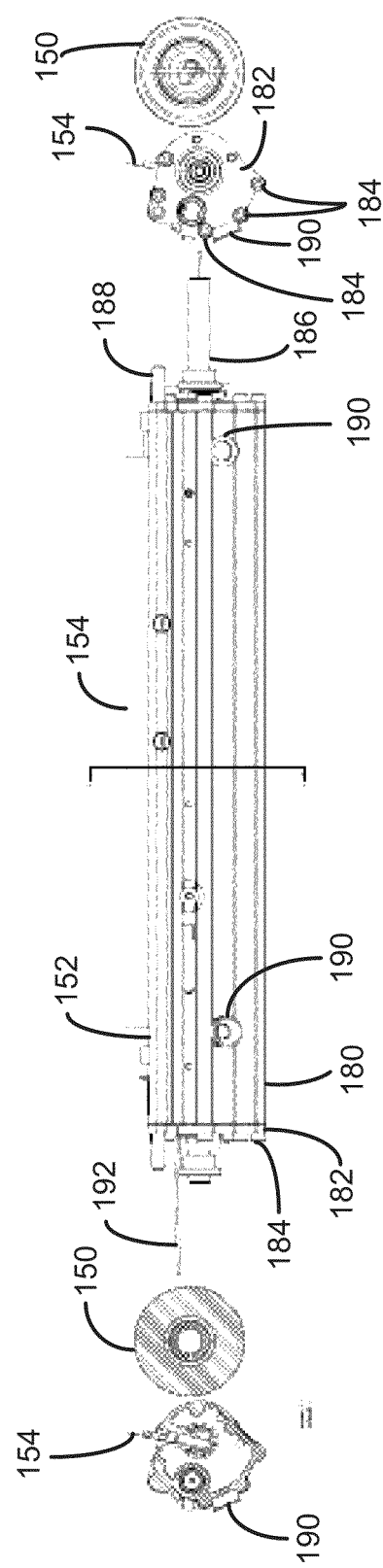
FIGS. 6A, 6B and 6C are end elevation, side elevation and sectioned side elevation views, respectively, similar to FIGS. 5A-5C but showing the waste material remover in a different position relative to the planerizer roller.

FIGS. 6A, 6B and 6C are end elevation, side elevation and sectioned side elevation views, respectively, of the waste material remover 152 and the planerizer roller 150 similar to FIGS. 5A-5C, but showing the waste material remover 152 rotated counterclockwise away from the planerizer roller 150. As can be seen in FIGS. 6B and 6C, the blade 154 has been rotated out of contact with the planerizer roller 150. The rotated position of the waste material remover 152 shown in FIGS. 6A-6C generally corresponds to its position as shown in FIG. 2.

FIGS. 7A, 7B and 7C are end elevation, side elevation and sectioned side elevation views, respectively, of the waste material remover 152 and the planerizer roller 150 similar to FIGS. 5A-5C, but showing the waste material remover 152 rotated counterclockwise such that the spouts 190 are pointed downwardly, e.g., to drain waste material from the waste material remover 152 into the waste material collector 164. The rotated position of the waste material remover 152 shown in FIGS. 7A-7C generally corresponds to its position as shown in FIG. 3.

Figure 8:
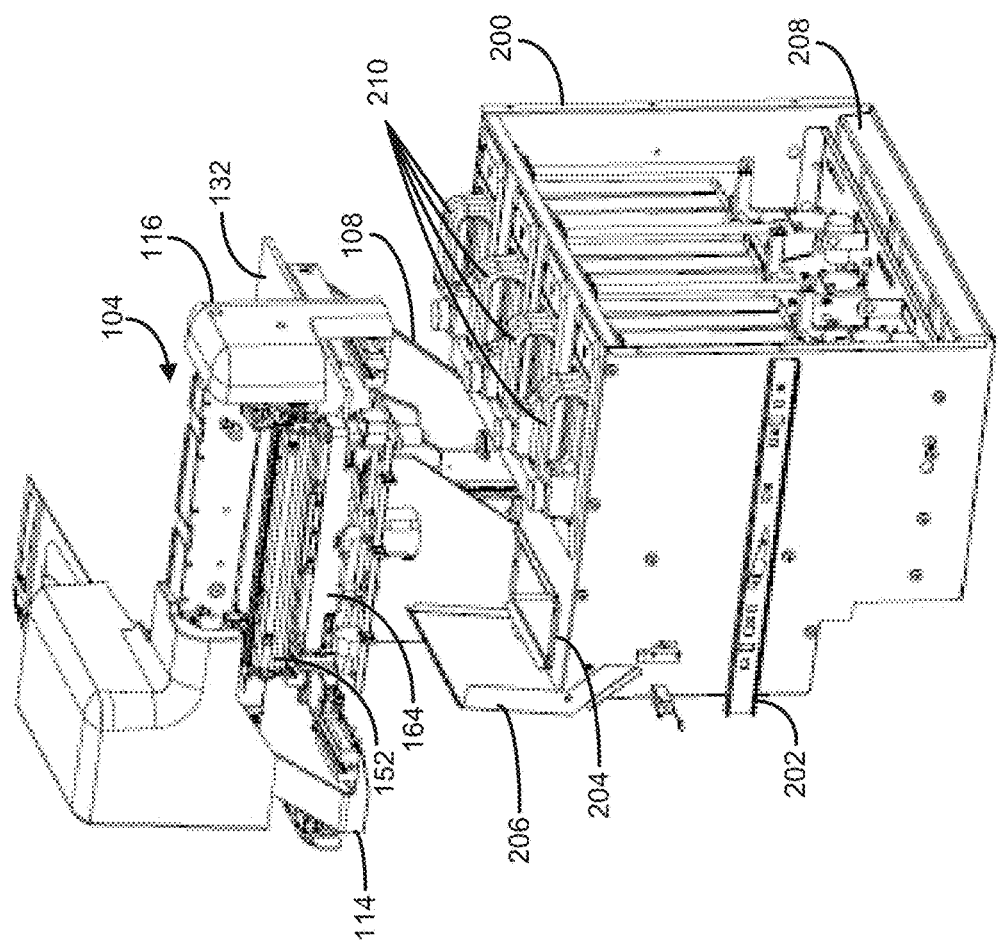
FIG. 8 is a perspective view of a portion of the 3D printing system of FIG. 1.
Figure 9A:
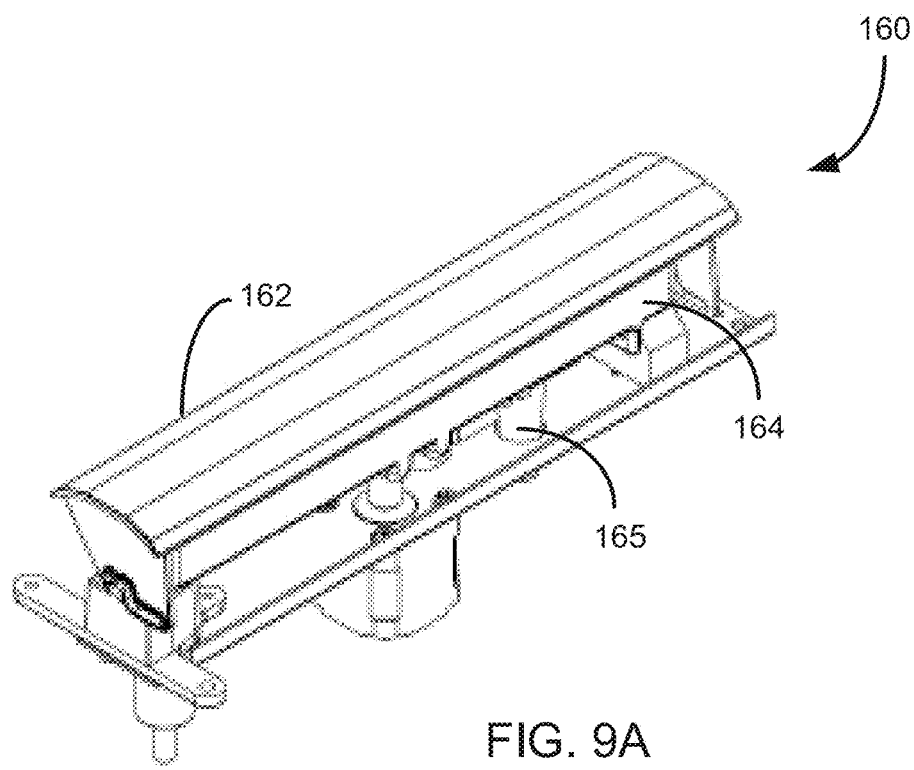
FIGS. 9A and 9B are perspective views of the head maintenance system of the 3D printing system of FIG. 1.
Figure 9B:
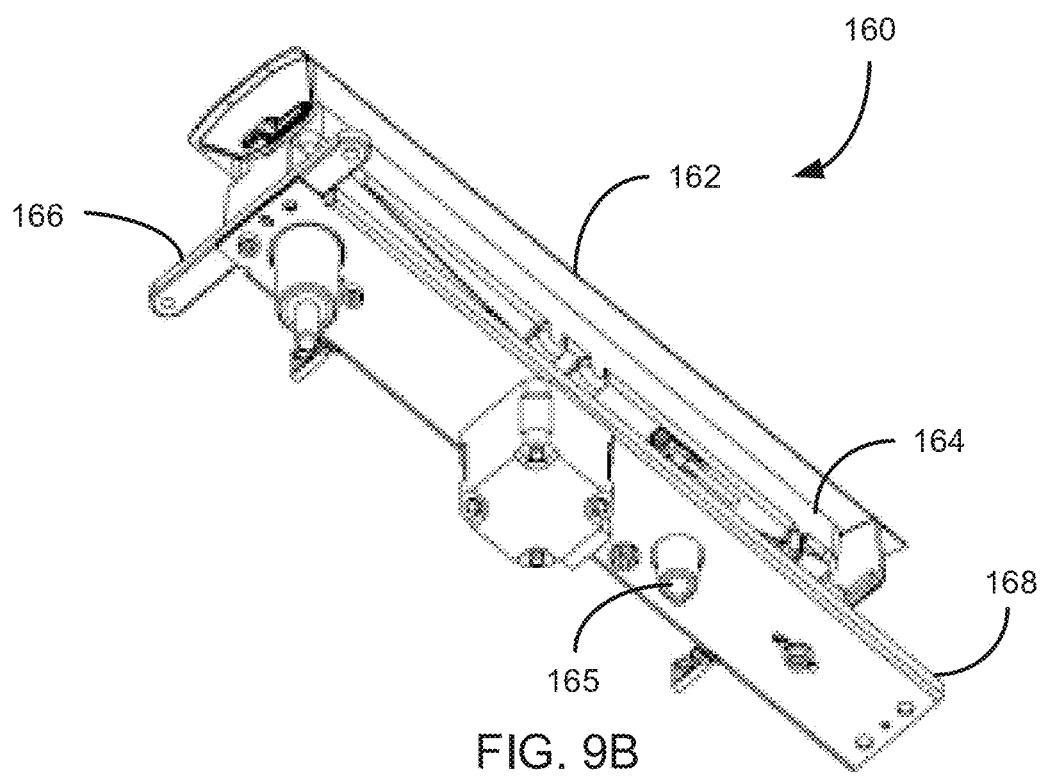

FIG. 8 is a perspective view of select components of the 3D printing system 100, including X-axis drive member 114, the X-axis cross member 116, the waste material remover 152, and also showing a drawer 200 positioned below the frame 102 (omitted from FIG. 8 for purposes of illustration). The drawer 200 is arranged on drawer slides 202. A waste bag opening 204 is defined in an upper surface of the drawer, and a waste bag cover 206 is pivotable to close the waste bag opening 204. In the illustrated implementation, a bottom of the drawer is defined by a catch tray 208. The drawer 200 can house 3D printing supplies, such as build and support material containers 210, as well as other materials. A portion of the drawer 200, its slides 202 and the waste bag portion are also visible in FIGS. 1-3.

Figure 13:
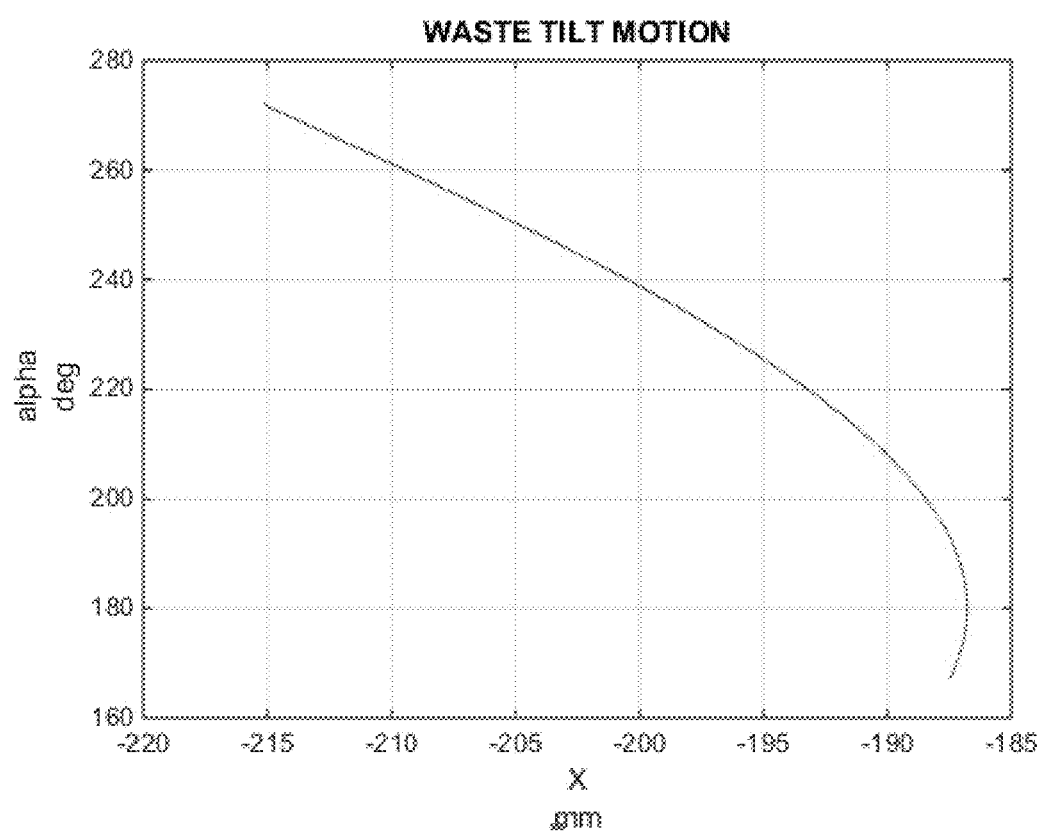
FIG. 13 is a graph of the motion of the waste material remover as it is rotated and translated during operation.

FIG. 13 is a graph showing the composite translation and rotation motion of the carriage 104 and the waste material remover 152 during the "dumping" process, i.e., transferring the waste material from the waste material remover 152 to the head maintenance system 160. Specifically, FIG. 13 illustrates how the carriage 104 is controlled to translate, first in the negative X-axis direction and then back in positive X-axis direction, while the waste material remover 152 is being controlled to rotate from a starting position (e.g., as shown in FIGS. 5A-5C) to a final position (as shown in FIGS. 7A-7C), to keep the ports 190 approximately centered over the waste material collector 164 as the waste material remover 152 is rotated.

In one representative embodiment, an equation for a graph having the same profile as in FIG. 13 can be given as PosX=pwTiltStartPosX−(W*cos(alpha) +W*cos(13°)) with pwTiltStartPosX equal to −187.5° and 13° being the inclination of the ports 190 above horizontal at the start position. The angle "alpha" is the angle of rotation of the waste material remover 152. The position at just over 270°, i.e., the left end of the motion profile shown in the graph, refers to the position of the ports 190 when they are directed vertically downward (FIGS. 7A-7C).

FIGS. 11A and 11B are perspective views of a waste material remover 352 according to an alternative embodiment. Instead of being controlled to move automatically and according to the motion described above and shown in FIG. 13, the waste material remover 352 is manually rotated. In some implementations, such rotation is only necessary periodically, e.g., to inspect the planerizer blade 354. To rotate the waste material remover 352, one or more catches, such as two catches 398 as shown in FIGS. 11A and 11B are released, and then the waste material remover 352 is free to be rotated manually as desired.

FIGS. 11A and 11B show the waste remover 352 in its normal orientation with the blade 354 positioned to contact the planerizer roller (not shown). As can be seen in FIG. 11A, the ports 390 are extend through a bottom surface of the body 380 and are directed downwardly. In some implementations, the head maintenance system is configured with an element that extends vertically to contact and open the ports 390 when the carriage 104 has moved the waste remover 352 into position above the collector (not shown).

FIG. 14 illustrates a representative container, such as a bag 280, and other related components of a bag assembly 276, which are connected to the drain spout of the waste material collector 162 and used to extend its collection volume. Specifically, the bag 280 is configured to be removably attached to the drain spout 165 such that collected waste material can drain into the bag 280. When the bag 280 is full, it can be removed. In some implementations, the bag 280 is disposable. It is also possible to configure a bag that can be cleaned and re-used.

The bag assembly 276 includes a screw cap 282 around which an open end of the bag 280 is fitted, and a pressure ring 284 on the outside of the bag 280 to hold the bag in place between the screw cap 282 and the pressure ring 284. In the illustrated implementation, the screw cap 282 is fitted to the drain spout 165. Heat can be applied in the area of the drain spout 165/screw cap 282 so that the waste material remains in a flowable state and does not harden, thereby creating a blockage.

In FIG. 15A, the bag assembly 276 is shown with an optional frame for holding and handling the bag 280. The frame includes a top plate 188 having an opening shaped to receive a neck area of the bag 280 and its closure. There are pairs of first and second handle segments connected at pivot connections (including a center pivot connection 296) that allow the frame to be positioned in its storage position (FIG. 15A, solid lines) and in a loading position (FIG. 15A, dashed lines) suitable for loading and unloading the bag 280, and establishing its connection with the waste material collector 162. Optionally, the bag 280 can be fitted with a rigid or semi-rigid shoulder (not shown) to help maintain the bag in an open condition.

Figure 12:
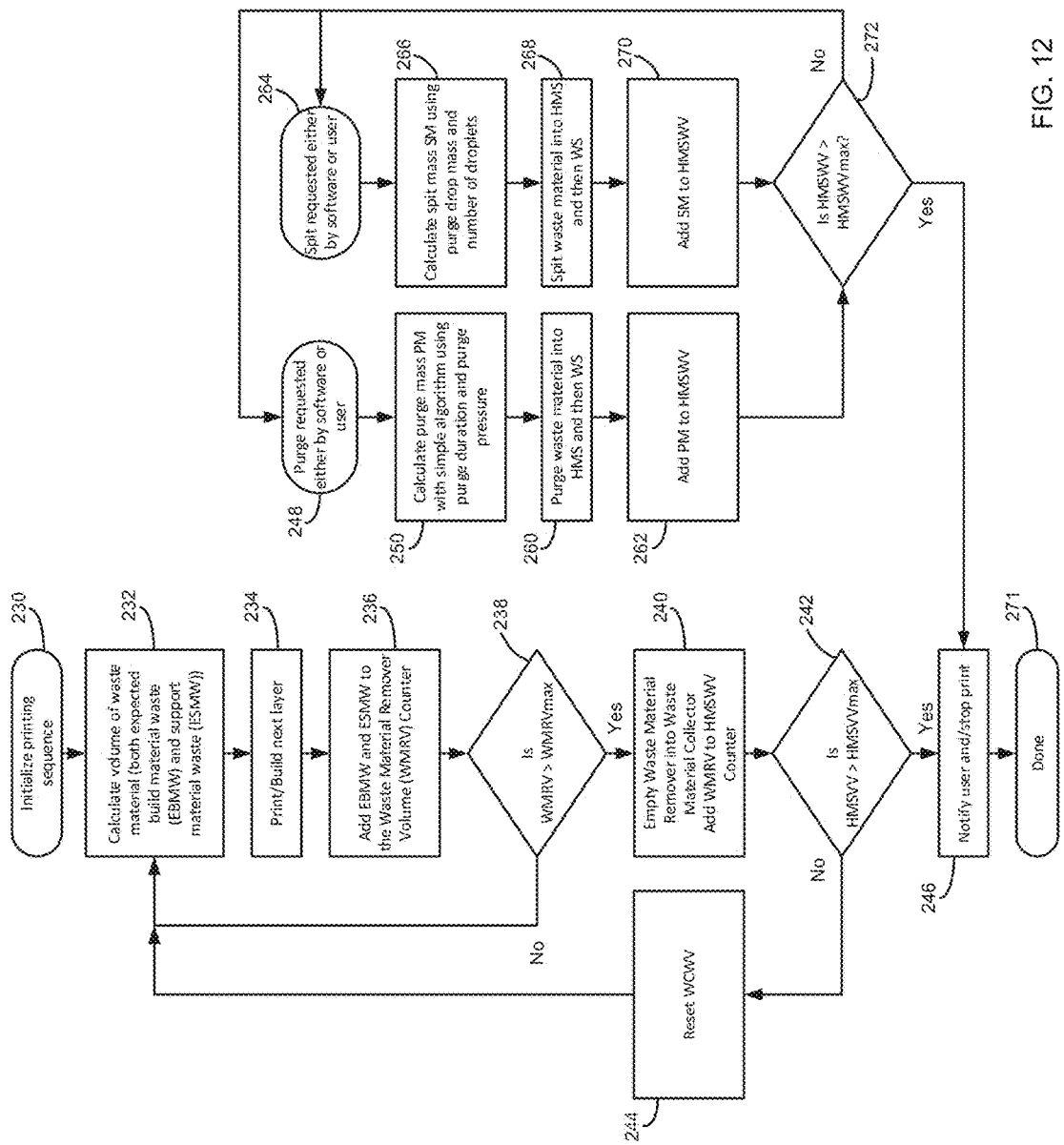
FIG. 12 is a flow chart of one representative method of addressing waste material during 3D printing operations.

FIG. 12 is a flow chart describing a representative method implementation of addressing waste material in 3D printing. In step 230, a 3D printing sequence is initialized. In the example of FIG. 12, the representative method envisions printing using a two-component 3D printing method, such as one that uses preselected amounts of a build material and a support material, for constructing the 3D printed object layer by layer.

In step 232, the volume of waste material is calculated. Specifically, volumes are calculated for the amounts of expected build material waste (EBMW) and expected support material waste (ESMW) for the next layer of the model being constructed. According to one approach, the 3D printing operations are carried out to "overprint" by predetermined amount(s) and relationships. Thus, the expected waste can be calculated by counting the pixels to be printed and applying one or more factors to account for the overprinting to the volume to be printed in the layer. Of course, it would be possible to further refine the calculation of volumes of expected waste material by incorporating other calculations as well.

In step 234, the next layer is printed according to the 3D printing routine. In step 236, a counter representing the current volume of waste material in the waste material remover 152 (WMRV) is increased by the EBMW and ESMW amounts calculated in step 232. In step 238, it is determined whether the calculated WMRV amount would exceed a predetermined $WMRV_{max}$ amount. If not, then the process returns to step 232 and the layer is printed.

If the calculated WMRV amount would exceed the predetermined $WMRV_{max}$ amount, then the process proceeds to step 240 and a "dump" sequence is initiated. Specifically, the waste material remover 152 is controlled to move into alignment with the head maintenance system 160 and empty its waste material contents into the waste material collector 164. The WMRV amount is then added to a counter HMSWV representing the volume of waste currently stored in the waste material collector 162, and more precisely, a "collection volume" that may include an attached bag 280 (FIG. 14) or other element connected to waste material collector 162 that has capacity for receiving waste material and is removable to allow for its disposal. In step 242, it is determined whether the collection volume is full by determining whether HMSWV exceeds a predetermined amount, $HMSWV_{max}$. If so, in step 246, the user is notified, such as with audio and/or visual indicators, and the printing process is halted so that the bag 280 can be removed and a new bag can be installed. If not, then the HMSWV counter is reset in step 244, and the process is repeated.

Optionally, the process can be programmed to implement one or more special request operations. First, in step 248, the process can recognize a purge request initiated by a user or the routine to cause waste material to be purged from the printhead P. In step 250, a purge amount PM, such a mass or volume of the purged amount, is calculated. In one approach, a relationship based on purge pressure and purge duration is used to determine PM. In step 260, the waste material is purged into the waste material collector 164. In step 262, the purge amount PM is added to HMSWV.

In step 272, it is determined whether the receptacle is full by determining whether HMSWV exceeds the predetermined amount, $HMSWV_{max}$. If so, in step 246, the user is notified, such as with audio and/or visual indicators, and the printing process is halted so that the bag 280 can be removed and a new bag can be installed. If not, then the HMSWV counter is reset, and the process is repeated.

Optionally, in step 264, the process can also recognize a spit request initiated by a user or the routine to cause waste material to be purged from the printhead P. In step 266, a spit amount SM, such a mass or volume of the purged amount, is calculated. In one approach, a relationship based on spit drop mass and number of spit droplets is used to determine SM. In step 268, the waste material is spat into the waste material collector 164.

In step 270, the purge amount SM is added to HMSWV. The process then proceeds to step 272 as described above to determine if the receptacle is full.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Some of the figures provided herein include an orientation system that includes an x-axis, a y-axis, and a z-axis that are mutually orthogonal to one another. It should be understood that the orientation system is merely for reference and can be varied. For example, the x-axis can be switched with the y-axis and/or the object or assembly can be rotated.

Figure 16:
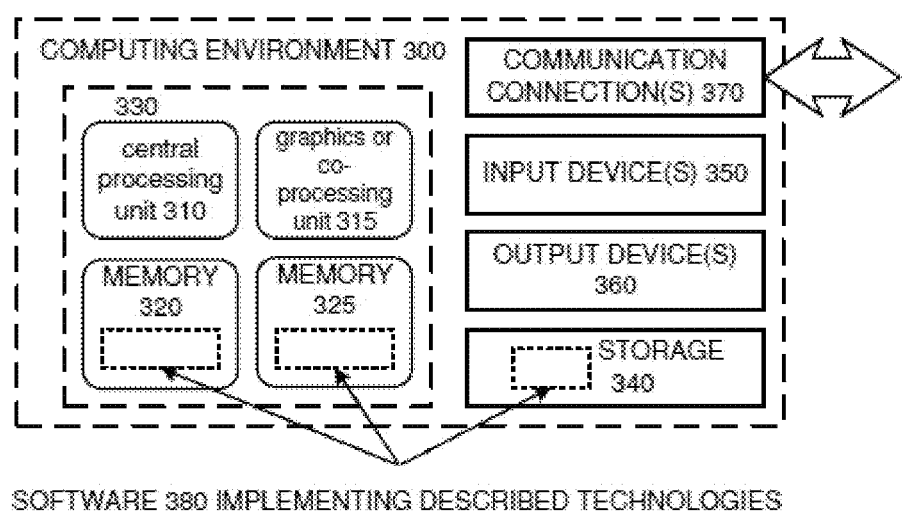
FIG. 16 is a diagram of a generalized computing environment.

FIG. 16 depicts a generalized example of a suitable computing environment 300 in which the described innovations may be implemented. The computing environment 300 is not intended to suggest any limitation as to scope of use or functionality, as the innovations may be implemented in diverse general-purpose or special-purpose computing systems. For example, the computing environment 300 can be any of a variety of computing devices (e.g., desktop computer, laptop computer, server computer, tablet computer, etc.)

With reference to FIG. 16, the computing environment 300 includes one or more processing units 310, 315 and memory 320, 325. In FIG. 16, this basic configuration 330 is included within a dashed line. The processing units 310, 315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 16 shows a central processing unit 310 as well as a graphics processing unit or co-processing unit 315. The tangible memory 320, 325 may be volatile memory (e.g., registers, cache, RAM), non-volatile memory (e.g., ROM, EEPROM, flash memory, etc.), or some combination of the two, accessible by the processing unit(s). The memory 320, 325 stores software 380 implementing one or more innovations described herein, in the form of computer-executable instructions suitable for execution by the processing unit(s).

A computing system may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The tangible storage 340 may be removable or non-removable, and includes magnetic disks, magnetic tapes or cassettes, CD-ROMs, DVDs, or any other medium which can be used to store information in a non-transitory way and which can be accessed within the computing environment 300. The storage 340 stores instructions for the software 380 implementing one or more innovations described herein.

The input device(s) 350 may be a touch input device such as a keyboard, mouse, pen, or trackball, a voice input device, a scanning device, or another device that provides input to the computing environment 300. The output device(s) 360 may be a display, printer, speaker, CD-writer, or another device that provides output from the computing environment 300.

The communication connection(s) 370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only preferred examples and should not be taken as limiting the scope of the disclosure. Rather, the scope of the disclosure at least as broad as the following claims. We therefore claim all that comes within the scope of these claims.

We claim:

1. A waste material handling and transfer assembly for a 3D printing system, comprising:
    a waste material remover comprising a movable waste removing element selectively movable into contact with a planerizer roller to remove 3D printing waste material from the planerizer roller, the waste material remover being coupled to translate with the planerizer roller and comprising an opening leading to a waste material receptacle configured to receive waste material and at least one port selectively operable to transfer waste material from the waste receptacle; and
    a waste material collector having a receiving position stationary relative to the waste material remover, wherein the waste material collector comprises an opening and a waste material storage recess to receive waste material transferred from the waste material remover via the at least one port and to store the received waste material for subsequent disposal,
    wherein the waste material remover is pivotable to at least two different positions comprising a first position in which the waste removing element is in contact with the planerizer roller and a second position in which the port of the waste material remover is aligned to transfer waste material from the waste material receptacle through the port and through the opening of the waste material collector into the waste material storage recess of the waste material collector.

2. The waste material handling and transfer assembly of claim 1, wherein the waste material remover comprises a heating element operable to heat waste material in the waste material receptacle to maintain the waste material in a flowable state.

3. The waste material handling and transfer assembly of claim 1, wherein the waste material remover is mounted to a stage of the 3D printing system to which a printhead is also mounted, and wherein the stage is selectively translatable back and forth in an X-axis direction during printing operations.

4. The waste material handling and transfer assembly of claim 1, wherein the waste removing element is configured as a blade and positionable to tangentially contact a surface of the planerizer roller as the roller is rotating.

5. The waste material handling and transfer assembly of claim 1, wherein the opening in the waste material receptacle comprises a slotted opening adjacent the waste removing element.

6. The waste material handling and transfer assembly of claim 1, wherein the waste material collector is configured with a cover member that can be selectively opened and closed.

7. The waste material handling and transfer assembly of claim 1, wherein the waste material collector comprises a collection bag formed of a flexible material.

8. The waste material handling and transfer assembly of claim 1, wherein the waste material collector comprises a heated element positioned adjacent the opening.

9. The waste material handling and transfer assembly of claim 1, wherein the waste material collector comprises a flexible bag and a frame having a first position for loading the flexible bag and a second position for supporting the flexible bag in an operating position.

10. The waste material handling and transfer assembly of claim 1, wherein the waste material collector comprises a wiper positioned to contact a printhead adjacent the waste material remover as the printhead translates past the waste material collector.

11. The waste material handling and transfer assembly of claim 1, wherein the waste material collector is accessible from a sliding drawer.

12. The waste material handling and transfer assembly of claim 1, wherein the waste material collector is positioned below an opening defined in an X-axis base and the waste material remover is coupled to a laterally movable member that is selectively movable relative to the X-axis base.

13. The waste material handling and transfer assembly of claim 1, wherein the waste material remover is configured to undergo a combined linear and sinusoidal movement as the waste material remover is pivoted to a position aligning the port with the waste material collector.

* * * * *